United States Patent [19]

Despres

[11] 3,734,266

[45] May 22, 1973

[54] TRANSFER STATION
[75] Inventor: Roger Despres, Saclay, France
[73] Assignee: Compagnie Generale D'Automatisme, Paris, France
[22] Filed: July 28, 1971
[21] Appl. No.: 166,848

[30] Foreign Application Priority Data

July 29, 1970 France.................................7028021

[52] U.S. Cl. ..........................198/24, 198/26, 92/121
[51] Int. Cl..............................................B65g 47/00
[58] Field of Search ......................198/24, 26; 92/121

[56] References Cited

UNITED STATES PATENTS

| | | | |
|---|---|---|---|
| 3,262,542 | 7/1966 | McClelland | 198/24 X |
| 3,429,458 | 2/1969 | McWilliams | 198/24 X |
| 3,298,497 | 1/1967 | Burford | 198/26 X |

FOREIGN PATENTS OR APPLICATIONS

| | | | |
|---|---|---|---|
| 799,831 | 8/1958 | Great Britain | 198/24 |
| 865,223 | 4/1961 | Great Britain | 92/121 |

Primary Examiner—Evon C. Blunk
Assistant Examiner—Merle F. Maffei
Attorney—Richard C. Sughrue et al.

[57] ABSTRACT

A transfer station comprising a ram operable to push an article from a first conveyor to a second conveyor which is parallel to the first one at least in the station. A partition is disposed between the conveyors and is mounted for vertical sliding movement in response to movement of the ram, and for pivotal movement about a substantially horizontal axis. An assembly is selectively operable to lock the partition in its vertical position.

3 Claims, 3 Drawing Figures

Patented May 22, 1973 3,734,266

TRANSFER STATION

BACKGROUND OF THE INVENTION

The present invention concerns a transfer station for transferring articles from a first conveyor to a second conveyor which runs parallel to the first at least in the transfer station.

In previously described transfer stations, at least one of the conveyors has generally been provided with vertical side walls intended to prevent the articles falling off the conveyor. In the transfer station it is obviously necessary to interrupt such side walls, as it would otherwise be impossible to transfer articles between the conveyors without a lifting as well as a sliding motion. Consequently, there is a risk that an article on the first conveyor will fall onto the second conveyor when this transfer was not intended. The disadvantages of such an inadvertent transfer will be apparent.

Conveyor distribution systems are in widespread use, for example for handling baggage at airports and for distributing and sorting post, warehouse stock or the like.

SUMMARY OF THE INVENTION

The present invention is intended to provide a transfer station in which such inadvertent transfers cannot take place.

In accordance with the invention a transfer station includes a ram operable to push an article from a first conveyor to a second conveyor parallel thereto at least in the station, a partition between the conveyors mounted for vertical sliding movement in response to movement of the ram and for pivotal movement about a horizontal axis, and means selectively operable to lock the partition in its vertical position.

BRIEF DESCRIPTION OF THE DRAWINGS

The invention will now be described in more detail, by way of example only, and with reference to the accompanying diagrammatic drawings in which.

DESCRIPTION OF THE PREFERRED EMBODIMENT

Figure 1:
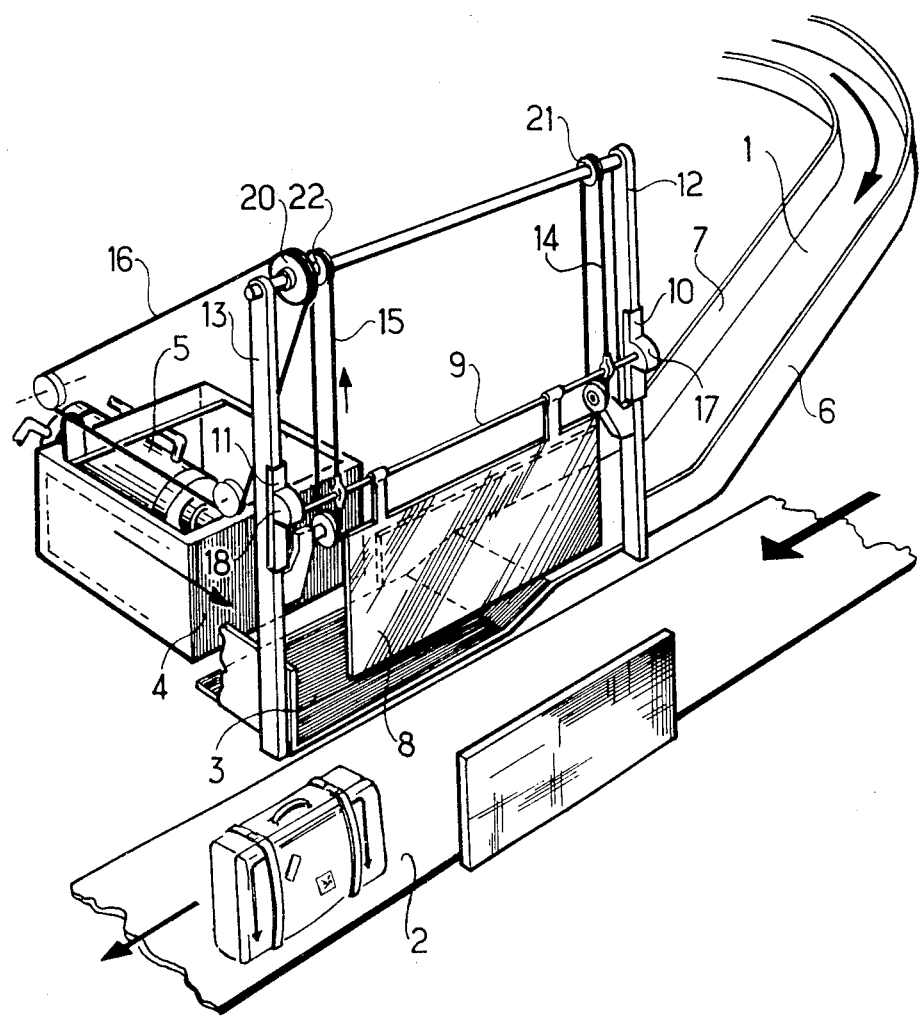
FIG. 1 is a perspective view of a transfer station constructed in accordance with the principles of the present invention.

Referring to FIG. 1, articles such as suitcases and the like arriving on a first conveyor 1 are to be transferred to a second conveyor 2. The incoming articles arrive on a platform 3, and a ram 4 is operable to push each article from this platform onto the second conveyor 2. The ram is operated by a pneumatic piston-and-cylinder arrangement 5.

While in the system illustrated in FIG. 1, any article arriving on conveyor 1 is transferred to conveyor 2, it will be appreciated that the first conveyor 1 could continue beyond the ram 4, selected articles only being transferred from the first conveyor 1 to the second conveyor 2 in the transfer station, the remainder continuing on the first conveyor 1.

The first conveyor 1 is provided with vertical side walls intended to prevent the articles from falling from the conveyor. These side walls are necessarily interrupted at the transfer station, to permit transfer of the articles by means of a simple sliding movement.

It will be appreciated that the second conveyor 2 might also be of a type provided with vertical side walls, in which case one of them would need to be interrupted at the transfer station, namely that adjacent the first conveyor 1.

A partition 8 is arranged between the conveyors 1 and 2 to prevent unwanted transfer of articles from the first to the second. The partition 8 is mounted for vertical sliding movement in response to movement of the ram 4, and for pivotal movement about a horizontal axis defined by a rod 9. The rod 9 is rigidly attached to the partition 8 and its opposite ends are mounted for pivotal movement in respective supports 10 and 11 slidable along respective vertical guides 12 and 13.

The partition 8 is movable vertically by chains 14 and 15 driven in response to movement of the ram 4 by a further chain 16.

The partition 8 is lockable in its vertical position by means of rotary jacks 17 and 18 disposed on the supports 10 and 11 respectively. When the partition is in its lowered position, as seen in the FIGS. 1 and 2, these jacks 17 and 18 are under pressure to prevent he pivotal movement thereof about the horizontal axis. When the partition 8 is raised, the jacks 17 and 18 are exhausted to permit this pivotal movement.

Figure 2:
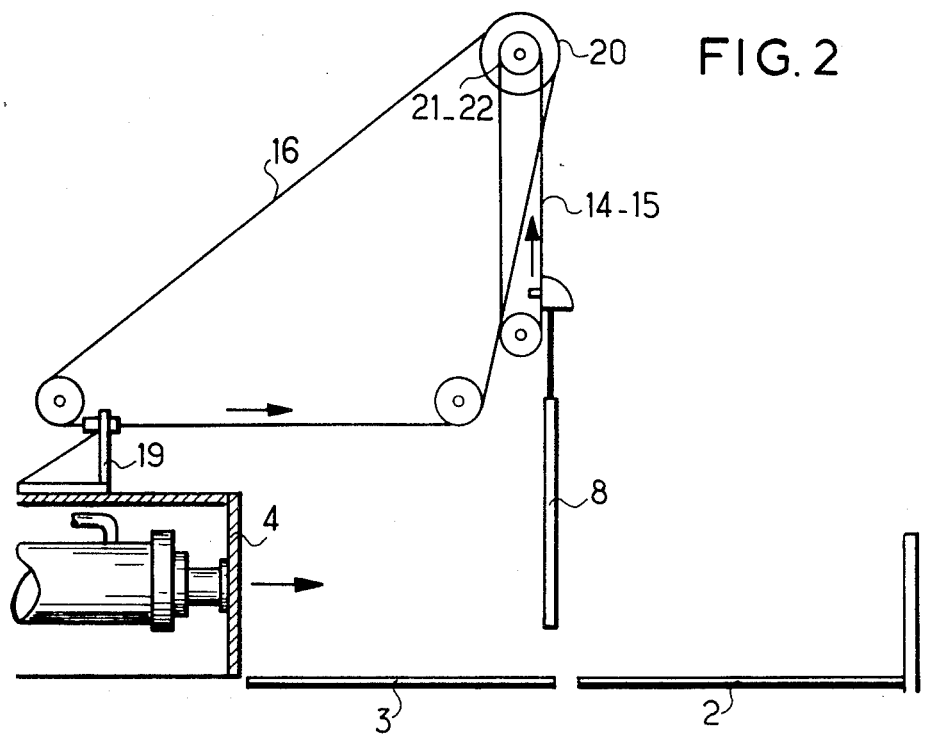
FIG. 2 shows the arrangement for vertical sliding movement of a partition thereof in response to movement of a ram thereof.

Referring to FIGS. 1 and 2, the sequence of operations on each transfer is as follows:

When an article on the platform 3 is to be slid onto the conveyor 2, the ram 4 is actuated and the jacks 17 and 18 simultaneously release. This can conveniently be arranged by using pneumatically operated jacks operated from the same source as the piston-and-cylinder arrangement 5 of the ram 4, the source being arranged to ensure that the jacks are under pressure when the ram is not, and vice versa.

As the ram 4 advances from left to right as seen in FIG. 2, an angle bracket 19 attached to the chain 16 moves with it, to drive the chain 16 in the direction indicated by the arrow, that is to say anti-clockwise. The chain 16 drives a chain wheel 20 mounted on a common shaft with chain wheels 21 and 22 around which pass chains 14 and 15 respectively. Wheels 21 and 22 rotate anti-clockwise with wheel 20, so that the chains 14 and 15 move in the direction indicated by the arrow, that is to say anti-clockwise. As these chains are coupled to the rod 9, the rod and the partition 8 move upwards.

As it moves upwards, the partition 8 is free to pivot about the horizontal axis, so that it can be pushed out of the way by the article as it moves from platform 3 to conveyor 2.

The relative diameters of wheels 20 and 21, 22 are selected to give the appropriate ratio between the horizontal distance moved by ram 4 and the vertical distance moved by the rod 9.

At the end of a transfer, with the partition 8 in its uppermost position, pressure is removed from the piston-and-cylinder arrangement 5 of the ram 4 and applied to jacks 17 and 18. The partition 8 is thus locked in its vertical position while it descends again to the position indicated in FIGS. 1 and 2. It is therefore prevented from fouling any article on conveyor 2 during its descent.

Figure 3:
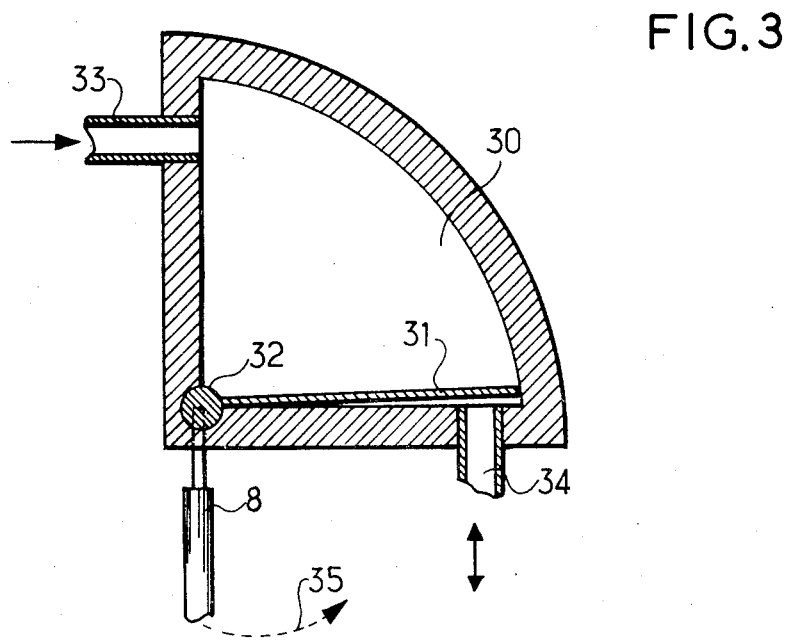
FIG. 3 is a cross-section through a rotary jack of the apparatus.

FIG. 3 shows one of the jacks 17 and 18 in cross-section. It comprises a sector-shaped working chamber 30, a vane 31 in the chamber being mounted for rotation with the partition 8 about an axis at the geometrical center of the sector realized by an axle 32. The axle 32 is rigidly connected to the partition 8.

A fluid inlet 33 is disposed on one side of the vane and a fluid outlet 34 on the opposite side.

When the jack is under pressure, the vane 31 is held rigidly against that face of the working chamber including the fluid outlet 34. Pivotal movement of the partition 8 is thereby prevented.

When the jack is not under pressure, the vane 31 can move freely in the chamber 30, to permit pivoting movement of the partition 8 as indicated by the arrow 35.

It will be appreciated that numerous modifications may be made to the transfer station just described, for example the system of chains for raising and lowering the partition 8 might be replaced by a system of drive belts and pulleys, and the rotary jacks 17 and 18 might be replaced by electro-mechanical locking devices or the like.

What is claimed is:

1. A transfer station for moving an article from a first conveyor to a second conveyor parallel thereto at least in the station, said station comprising a ram operable to push an article from said first conveyor to said second conveyor, a partition between said conveyors mounted for vertical sliding movement in response to movement of the ram and for pivotal movement about a substantially horizontal axis, and means selectively operable to lock the partition in a substantially vertical position, said partition being mounted on at least one support slidable along a vertical guide, and being pivoted to said support for movement about a horizontal axis, said locking means including at least one rotary jack comprising a sector-shaped working chamber, a vane in said chamber mounted for rotation with said partition about an axis at the geometrical center of said sector, a fluid inlet on one side of said vane, and a fluid outlet on the opposite side thereof.

2. A transfer station as claimed in claim 1, wherein said jacks are two in number, the partition is hung from a rod providing an axle supported for rotation in each of two spaced supports, and each support carries a respective rotary jack whose vane is rigidly connected to the rod for rotation about the axis thereof.

3. A transfer station as claimed in claim 2, wherein: said ram and said jack are pneumatically operated from a common source arranged such that said jack is under pressure when said ram is not, and vice versa.

* * * * *